Patented Oct. 28, 1952

2,615,814

UNITED STATES PATENT OFFICE 2,615,814

PROCESS OF PRESERVING FRUITS AND VEGETABLES

Robert J. Geary, Blue Point, N. Y.

No Drawing. Application June 9, 1951, Serial No. 230,846

14 Claims. (Cl. 99—154)

This invention relates to the preservation of fruits and vegetables. More particularly, it relates to the preservation of skinless surfaces of fruits and vegetables and to a method and composition for producing same.

The advantages to be derived from the marketing of fruits and vegetables having skinless surfaces, as for example in peeled, sliced, sectioned or similar condition, have become increasingly apparent to all concerned, including the food processing and retailing trades and the ultimate consumers. These advantages may perhaps be most widely availed of in connection with the freezing and canning arts. However, there are many additional uses in which these advantages are highly desirable, as for example in the sale of fresh peeled or cut fruits and vegetables directly to the consumer, to the retailer for resale or display purposes, to restaurants or hotels in order to save time and labor in preparing meals, to eliminate the waste involved in hand-peeling methods by substitution of preliminary mechanical peeling methods, and the like. Likewise, consumers in the home may avail themselves of similar advantages by way of preliminary preparation of meals, of ornamental displays, etc.

More widespread use of these advantages has however been prevented up to the present because of the known tendency of all freshly exposed surfaces of fruits and vegetables to undergo more or less immediate discoloration and deterioration. While many attempts to remedy this deficiency have been recorded in the past, they have all been subject to various objections from the standpoint of economy, difficulty and/or danger in application, toxicity, taste and/or smell in the treated food, and the like. Representative of such prior attempts are the use of sulfur dioxide, sodium bisulfite, sulfurous acid, acetic acid and sodium chloride, sodium metabisulfite, thiosulfates, sulfhydryl compounds, hydrogen peroxide, carbon dioxide, steaming, cooking, and the like alone or in combination.

It is an object of this invention to provide a satisfactory solution of the aforementioned deficiencies by use of a new composition and method for applying same. Other objects and advantages will appear as the description proceeds.

The attainment of these objects is made possible by applicant's discovery that choline compounds, or lecithin, which is readily hydrolyzed to choline compounds, when applied to the skinless surfaces of fruits and vegetables, alone but preferably in combination with an 8-hydroxy quinoline compound, satisfactorily inhibits the further discoloration and deterioration of such surfaces.

As choline-containing compounds may be mentioned lecithin, which hydrolyzes in or on plant tissues to produce choline derivatives, and choline compounds such as choline chloride, choline citrate and the like. Such compounds are preferred which are sufficiently soluble or dispersible in the liquid media selected for application. Choline salts are eminently suitable therefor.

As the 8-hydroxy quinoline compound may be mentioned 8-hydroxy quinoline per se, 8-hydroxy quinoline sulfate, 8-hydroxy benzoate and the like. As with the choline-containing compounds, 8-hydroxy quinoline compounds are preferred which are readily soluble or dispersible in the selected liquid media. Obviously, any substituents may be present on the 8-hydroxy quinoline compound which are inert and which do not effect the operativeness of the active 8-hydroxy quinoline nucleus thereof.

The liquid media selected for application is preferably water, and choline-containing compounds and 8-hydroxy quinoline compounds are accordingly employed therein which are water-soluble or dispersible to produce stable dispersions. However, other liquid media may be employed such as alcohol, acetone and other organic solvents which are inert with respect to the aforementioned compounds and to the fruit or vegetable being treated. When employing such organic solvents, the said compounds will of course be selected for adequate solubility or dispersibility therein. The composition containing the active ingredients should preferably be in the form of a solution or stable dispersion, e. g., emulsion or suspension, since otherwise, means must be provided to maintain the ingredients uniformly distributed throughout the liquid media. The use of a suitable dispersing agent in small quantities may be advantageous in some instances. The concentrations of the ingredients in the liquid media, by weight, may range from about $\frac{1}{20}$% to about 1% for the 8-hydroxy quinoline compound and from about $\frac{1}{20}$% to about 5% for the choline-containing compound. The composition is prepared in any suitable manner, the ingredients being added in any order or together.

The preferred temperature at which the treating composition is to be maintained during application ranges from about 32 deg. F. to about 125 deg. F., and preferably from about 40 deg. F. to about 50 deg. F. Higher temperatures may be employed in the treatment of certain fruits and vegetables but no particular advantage is to be gained thereby. The duration of treatment ranges from about ½ minute to about 10 minutes, although longer periods may be employed in some instances. Obviously the concentrations, temperatures, duration and other variables employed in any particular instance will depend to some extent on the nature of the food being treated, such as its chemical composition, previous treatment and the like. While immersion is the preferred mode of treatment, other methods may be employed such as spraying, fog or vapor application, and the like.

Any suitable fruit or vegetable having a skinless surface may be treated in accordance with this invention, as for example potatoes, cucumbers, eggplants, rutabagas, turnips, onions, lettuce, endive, cauliflower, celery, papaya, pineapples, bananas, apples, pears, apricots, peaches and similar foods. In treating the foods, they are peeled, sliced, sectioned, cut, etc., in any desired manner, care being taken to prevent decomposition of the exposed skinless surfaces by exposure to any deleterious influence such as high temperatures, prolonged exposure to the atmosphere or other harmful gases, vapors or liquids and the like. Preferably and for best results the fruits and vegetables should be kept cool from harvest until treatment. However, preliminary treatment by any of the methods known in the art will not effect the efficacy of the instant invention provided such preliminary treatment is not harmful or deleterious per se. Subsequent to the treatment in accordance with the present invention, the treated products should be kept at normal temperatures of about 31 deg. F. to about 60 deg. F. and normal or low relative humidities.

The following specific examples are merely illustrative of the invention as described above, and are not to be regarded as limitative:

Example 1

An aqueous solution is made containing $\frac{1}{20}\%$ of 8-hydroxy quinoline and $\frac{1}{10}\%$ of choline chloride by merely adding and stirring into the correct amount of water. Peeled fruits and vegetables, for example potatoes, are then immersed in this mixture for from ½ minute to 5 minutes at a preferred temperature of 40 to 50 deg. F. The treated products are thus protected against discoloration and deterioration for relatively prolonged periods without any adverse effects on their normal taste or smell.

The above mixture may be varied to contain up to 1% of 8-hydroxy quinoline and ½% of choline chloride, depending on the food being treated and the treating conditions.

Example 2

An aqueous mixture containing $\frac{1}{20}\%$ of 8-hydroxy quinoline and ½% of lecithin is prepared by first dissolving the 8-hydroxy quinoline in water and then adding the lecithin in the form of an emulsion made by adding it to a small amount of water and stirring or shaking vigorously. Foods are then treated with this mixture in the manner set forth in Example 1, with similar results.

The following formulations may be used with equally advantageous results:

Example 3

$\frac{1}{20}\%$ to 1% of 8-hydroxy quinoline sulfate and $\frac{1}{20}\%$ to 1% of choline chloride in water.

Example 4

$\frac{1}{20}\%$ to 1% of 8-hydroxy quinoline benzoate and $\frac{1}{20}\%$ to 1% of choline chloride in water.

Example 5

$\frac{1}{20}\%$ to 1% of 8-hydroxy quinoline sulfate and $\frac{1}{20}\%$ to 5% of lecithin in water.

Example 6

$\frac{1}{20}\%$ to 1% of 8-hydroxy benzoate and $\frac{1}{20}\%$ to 5% of lecithin in water.

While various examples and illustrations of this invention have been described above, it will be understood that various other embodiments and modifications readily apparent to those skilled in the art may be made without departing from the essence of this invention. Such other embodiments and modifications are to be regarded as within the purview of this application and the spirit and scope of the appended claims.

I claim:

1. A composition for treating skinless surfaces of fruits and vegetables comprising a mixture of an 8-hydroxy-quinoline compound and a member of the group consisting of lecithin and choline compounds.

2. A composition for treating skinless surfaces of fruits and vegetables comprising an 8-hydroxy quinoline and a member of the group consisting of lecithin and choline compounds dispersed in an inert liquid medium.

3. A composition for treating skinless surfaces of fruits and vegetables comprising an aqueous dispersion containing from about $\frac{1}{20}\%$ to about 1% by weight of an 8-hydroxy quinoline compound and from about $\frac{1}{20}\%$ to about 5% by weight of a compound selected from the group consisting of lecithin and choline compounds.

4. A composition for treating skinless surfaces of fruits and vegetables comprising an aqueous dispersion of choline chloride and 8-hydroxy quinoline.

5. A composition for treating skinless surfaces of fruits and vegetables comprising an aqueous dispersion containing $\frac{1}{10}\%$ by weight of choline chloride and $\frac{1}{20}\%$ of 8-hydroxy quinoline.

6. A composition for treating skinless surfaces of fruits and vegetables comprising an aqueous dispersion of lecithin and 8-hydroxy quinoline.

7. A composition for treating skinless surfaces of fruits and vegetables comprising an aqueous dispersion containing ½% by weight of lecithin and $\frac{1}{20}\%$ by weight of 8-hydroxy quinoline.

8. A process comprising treating the skinless surfaces of fruits and vegetables with a member of the group consisting of lecithin and choline compounds dispersed in an inert liquid medium for at least ½ minute at a temperature of from about 32 deg. F. to about 125 deg. F.

9. A process comprising treating the skinless surfaces of fruits and vegetables with a mixture of an 8-hydroxy quinoline compound and a member of the group consisting of lecithin and choline compounds, dispersed in an inert liquid medium, for at least ½ minute at a temperature of from about 32 deg. F. to about 125 deg. F.

10. A process comprising treating the skinless surfaces of fruits and vegetables with an aqueous dispersion containing from about $\frac{1}{20}\%$ to about 1% by weight of an 8-hydroxy quinoline compound and from about $\frac{1}{20}\%$ to about 5% by weight of a compound selected from the group consisting of lecithin and choline compounds for at least ½ minute at a temperature of from about 32 deg. F. to about 125 deg. F.

11. A process comprising treating the skinless surfaces of fruits and vegetables with an aqueous dispersion of choline chloride and 8-hydroxy quinoline for at least ½ minute at a temperature of from about 32 deg. F. to about 125 deg. F.

12. A process comprising treating the skinless surfaces of fruits and vegetables with an aqueous dispersion containing 1/10% by weight of choline chloride and 1/20% of 8-hydroxy quinoline for at least ½ minute at a temperature of from about 32 deg. F. to about 125 deg. F.

13. A process comprising treating the skinless surfaces of fruits and vegetables with an aqueous dispersion of lecithin and 8-hydroxy quinoline for at least ½ minute at a temperature of from about 32 deg. F. to about 125 deg. F.

14. A process comprising treating the skinless surfaces of fruits and vegetables with an aqueous dispersion containing ½% by weight of lecithin and 1/20% by weight of 8-hydroxy quinoline.

ROBERT J. GEARY.

REFERENCES CITED

The following references are of record in the file of this patent:

UNITED STATES PATENTS

| Number | Name | Date |
|---|---|---|
| 2,315,858 | Johnston et al. | Apr. 6, 1943 |